(12) United States Patent
Gärtner et al.

(10) Patent No.: US 9,046,199 B2
(45) Date of Patent: Jun. 2, 2015

(54) PROCESS FOR MANUFACTURING A HEAT-INSULATED UNCOUPLING ELEMENT AND AN UNCOUPLING ELEMENT, ESPECIALLY FOR EXHAUST GAS LINES OF INTERNAL COMBUSTION ENGINES

(75) Inventors: Immo Gärtner, Karlsruhe (DE); Holger Hebisch, Ötigheim (DE)

(73) Assignee: BOA BALG- UND KOMPENSATOREN-TECHNOLOGIE GMBH, Stutensee (DE)

( * ) Notice: Subject to any disclaimer, the term of this patent is extended or adjusted under 35 U.S.C. 154(b) by 173 days.

(21) Appl. No.: 13/810,265

(22) PCT Filed: Mar. 12, 2012

(86) PCT No.: PCT/EP2012/001092
§ 371 (c)(1),
(2), (4) Date: Jan. 15, 2013

(87) PCT Pub. No.: WO2012/126580
PCT Pub. Date: Sep. 27, 2012

(65) Prior Publication Data
US 2013/0133776 A1    May 30, 2013

(30) Foreign Application Priority Data
Mar. 18, 2011   (DE) .......................... 10 2011 014 350

(51) Int. Cl.
*F16L 11/00*   (2006.01)
*F01N 13/18*   (2010.01)
*F16L 59/18*   (2006.01)
*F16L 59/21*   (2006.01)
*F16L 27/10*   (2006.01)
*F16L 27/11*   (2006.01)

(52) U.S. Cl.
CPC ............. *F16L 11/00* (2013.01); *F01N 13/1811* (2013.01); *F01N 13/1816* (2013.01); *F16L 59/185* (2013.01); *F16L 59/21* (2013.01); *F16L 27/1004* (2013.01); *F16L 27/11* (2013.01)

(58) Field of Classification Search
CPC ..... F16L 11/00; F16L 59/185; F16L 27/1004; F01N 13/1811
USPC ................... 138/121, 145, 149, 173; 427/180
See application file for complete search history.

(56) References Cited

U.S. PATENT DOCUMENTS 1,689,311 A * 10/1928 Wheeler .................... 174/121 B
2,256,386 A *  9/1941 Farrar et al. .................. 138/131

(Continued)

FOREIGN PATENT DOCUMENTS

DE      76 38 583 U1    6/1977
DE     297 13 484 U1    9/1998

(Continued)

*Primary Examiner* — Paul R Durand
*Assistant Examiner* — Vishal Pancholi
(74) *Attorney, Agent, or Firm* — McGlew and Tuttle, P.C.

(57) ABSTRACT

A process for manufacturing a heat-insulated uncoupling element as well as an uncoupling element itself are proposed, wherein the heat insulation is provided along the corrugated area of bellows. The heat insulation consists of a coating, which contains heat-insulating granular material. The mobility of the bellows is also ensured here after application of the heat insulation.

20 Claims, 1 Drawing Sheet

(56) References Cited

U.S. PATENT DOCUMENTS

| | | | | |
|---|---|---|---|---|
| 2,778,759 | A | * | 1/1957 | Stephens et al. ............... 138/156 |
| 3,009,601 | A | * | 11/1961 | Matsch .................... 220/560.13 |
| 4,345,430 | A | * | 8/1982 | Pallo et al. ...................... 60/282 |
| 5,901,754 | A | * | 5/1999 | Elsasser et al. ............... 138/118 |
| 6,131,614 | A | * | 10/2000 | Eastham et al. ............. 138/110 |
| 6,324,837 | B1 | * | 12/2001 | Jenne et al. ..................... 60/322 |
| 6,893,053 | B2 | | 5/2005 | Thomas et al. |
| 6,897,375 | B2 | * | 5/2005 | Lindner ........................ 174/507 |
| 7,004,203 | B2 | * | 2/2006 | Claussen et al. ............. 138/149 |
| 7,066,495 | B2 | | 6/2006 | Thomas et al. |
| 2003/0047941 | A1 | | 3/2003 | Thomas et al. |
| 2003/0137147 | A1 | | 7/2003 | Girot et al. |
| 2004/0100094 | A1 | | 5/2004 | Thomas et al. |
| 2006/0081302 | A1 | * | 4/2006 | Taira et al. .................... 138/118 |
| 2008/0121304 | A1 | * | 5/2008 | Carlier et al. ................ 138/149 |

FOREIGN PATENT DOCUMENTS

| | | |
|---|---|---|
| DE | 602 13 338 T2 | 8/2007 |
| DE | 10 2007 043 944 A1 | 3/2009 |
| EP | 1 329 609 A1 | 7/2003 |

* cited by examiner

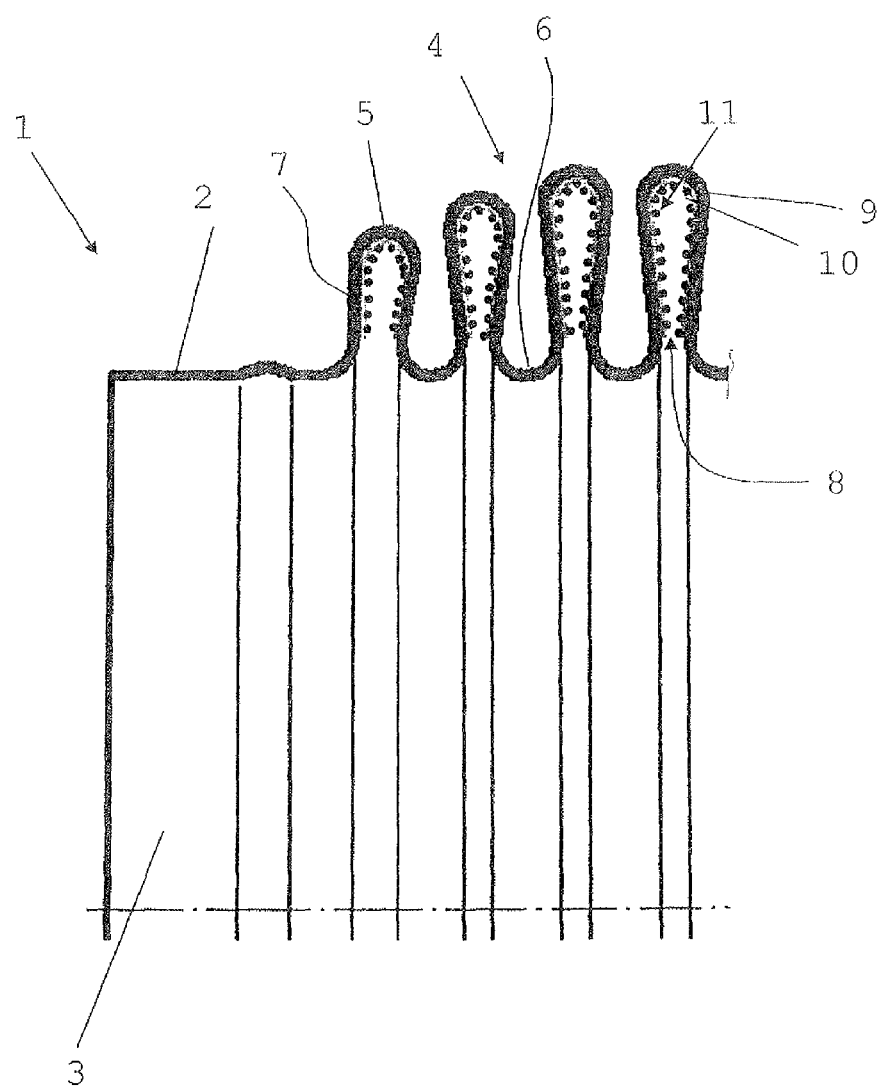

PROCESS FOR MANUFACTURING A HEAT-INSULATED UNCOUPLING ELEMENT AND AN UNCOUPLING ELEMENT, ESPECIALLY FOR EXHAUST GAS LINES OF INTERNAL COMBUSTION ENGINES

CROSS REFERENCE TO RELATED APPLICATIONS

This application is a United States National Phase application of International Application PCT/EP2012/001092 and claims the benefit of priority under 35 U.S.C. §119 of German patent application DE 10 2011 014 350.5 filed Mar. 18, 2011, the entire contents of which are incorporated herein by reference.

FIELD OF THE INVENTION

The present invention pertains to a process for manufacturing a heat-insulated uncoupling element, especially for exhaust gas lines of internal combustion engines, by applying a heat insulation, as well as to an uncoupling element, especially for exhaust gas lines of internal combustion engines, with a bellows and with a heat insulation of same.

BACKGROUND OF THE INVENTION

Uncoupling elements are installed as spacers in exhaust gas lines of motor vehicles in order to uncouple motions and vibrations to the extent possible. The uncoupling element has a movable bellows made of metal for this, which has a spiral wound metallic hose in the inner area for the purpose of ducting exhaust gas and of protecting the bellows.

After treatment of the exhaust gases, e.g., by means of soot particle filters, is increasingly necessary in modern exhaust systems. In order for such devices to operate in a useful manner, the exhaust gases must have high temperatures. To guarantee, on the one hand, minimum heat loss from the engine outlet to the filter inlet and, on the other hand, to heat-insulate the sensitive bellows against the hot exhaust gas fluid, more or less elastic mats are integrated for insulation in various radial layers within the uncoupling element. Such a heat insulation is known from DE 10 2007 043 944 A1, in which a flexible line element with combined heat insulation and vibration damping is described. A layer built up of a plurality of layers with the shape of a hollow cylinder is arranged between a flexible inner part carrying the exhaust gases and a flexible, gas-tight jacket part.

The drawback of this and similar structural shapes is, on the one hand, reduced flexibility of the uncoupling element and, on the other hand, short service life of the insulation layer, because this does not have the flexibility of the uncoupling element and is heavily stressed by continual vibrations of the exhaust system. The materials used for the insulation must absorb great expansions due to their hollow cylindrical shape during the absorption of motions of the hose. This additionally greatly limits the selection of suitable materials, especially of heat-resistant materials.

SUMMARY OF THE INVENTION

The object of the present invention is therefore to provide an uncoupling element, whose mobility is not limited despite heat insulation.

This object is accomplished according to the present invention with a process of the type mentioned in the introduction, which carries out the following steps one after another:

a) Wetting of a region to be coated in a corrugated area of a bellows body with a bonding agent;
b) Distribution of heat-insulating granular material in the region to be coated on the bonding agent;
c) Drying of the bonding agent; and
d) Removal of excess granular material not bonded by the bonding agent to the bellows body.

Furthermore, the object is accomplished by an uncoupling element of the type mentioned in the introduction, wherein the heat insulation is arranged along the corrugated area of the bellows, and the heat insulation consists of a coating, which has heat-insulating granular material.

In a heat insulation for an uncoupling element for exhaust gas lines, a prefabricated bellows, whose corrugations are sinusoidally preformed, is first wetted with a bonding agent at certain points of the bellows. The present invention preferably makes provisions in this connection for the bonding agent to consist of a lacquer here. Provisions are especially made in an especially preferred embodiment of the present invention for a lacquer to be used as a bonding agent. A high-temperature-resistant lacquer, as it is used, e.g., in the manufacture of ovens, is especially suitable for use as a bonding agent. Such lacquers are based on a silicone resin, are heat resistant up to 600° C. and withstand great temperature variations. The wetting is usually performed by lacquering, for which spray coating, centrifugal coating or dip coating or even other types of coating are employed.

The terms inner and outer rim are defined as follows: A corrugation rim is a toroidal half shell, which defines a corrugation on the outer diameter (outer rim) or on the inner diameter (inner rim), wherein a flank is the connection between outer rim and inner rim on both sides of the corrugation, see "Handbuch der Wellenschläuche" (Manual of Corrugated Tubes) of the firm of Witzemann.

The location of the coating is regions on the bellows wall, which are not stressed mechanically by contact with adjacent components. Thus, outer surfaces of the inner rims, inner surfaces of the outer rims, as well as the bellows flanks are suitable. The present invention especially preferably makes provisions for the bonding agent to be applied along the entire length of the bellows area on the surface thereof, wherein the bonding agent is applied on the outer side of the bellows to outer surfaces of inner rims and/or on the inner side of the bellows to inner surfaces of outer rims, and/or for the heat insulation to be applied inside and/or outside the bellows on bellows flanks thereof.

The present invention makes provisions, in particular, for the heat-insulating granular material as the insulating material to be held on the bellows by a bonding agent. A heat-insulating granular material is distributed here on the regions coated with bonding agent along the bellows, the granular material being distributed by tilting and rotary motions about the longitudinal axis of the bellows. The granular material now sticks to the regions coated with bonding agent. The thickness of the layer of the bonding agent may be preferably up to 1 mm.

A granular material consisting of AeroGel or NanoGel is preferably used. To achieve better adhesion of the granular material to the bonding agent, provisions are, furthermore, made for the granular material to be pressed into the bonding agent, for example, by means of a pressing mandrel. Drying of the bonding agent is brought about by waiting for a certain time period or by partial heating of the coated regions. The particle diameter of a suitable granular material is typically 1 mm, i.e., between 0.5 mm and 1.5 mm, but it may also assume upper values of 2 mm to 5 mm. A coarse size of the granular material is desirable for thus achieving a high heat insulation due to a layer of granular material (without the granular material being multilayered, which is possible, in principle). A small layer thickness of the bonding agent is desirable for economic reasons. However, it must hold the insulating granular material reliably and lastingly.

Excess granular material is removed hereafter, and this is carried out by simply tipping out or shaking off. Provisions are made, in particular, for the application of the heat insulation to the wall of a bellows to be performed before the bellows is finally deformed to the shape of a lyre and for the bellows to be further compressed after removal of the excess granular material, so that the corrugations of the bellows will assume an CI-shaped cross section. Due to the heat insulation consisting of this coating, the mobility of the bellows is preserved to the greatest extent possible, and a possibly increased initial friction between the particles of the granular material is eliminated by abrasion during compressing.

An essential advantage of the heat insulation according to the present invention is the simple process of manufacturing same, as well as the greatest possible insulation by overlapping coating within the bellows in outer rims as well as outside the bellows in the inner rims. The heat-insulating coating as such is highly flexible, as a result of which the flexibility of the bellows is preserved to the greatest extent possible.

The present invention will be explained in more detail below on the basis of drawings, which show exemplary embodiments only. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a partial longitudinal section of an embodiment of an uncoupling element according to the present invention with a heat insulation.

DESCRIPTION OF THE PREFERRED EMBODIMENTS

FIG. 1 shows a partial view through an uncoupling element 1 according to the present invention, which has a bellows 2 with cylindrically shaped connection area 3 as well as with a corrugated area 4. Corrugated area 4 extends over the major part of the overall length of bellows 2 and has corrugations with outwardly bent outer rims 5 and inwardly bent inner rims 6. Bellows flanks 7 are located between the inner rims 6 and the outer rims 5.

A heat insulation 8 is provided in this embodiment within bellows 2. Heat insulation 8 is arranged on an inner side 9 of outer rim 5 and is connected to the latter in a positive-locking manner by bonding. Heat insulation 8 is bonded from a bonding agent 10, e.g., a lacquer, and an insulating material 11 bonded by this to bellows 2. Insulating material 11 consists of a densely packed heat-insulating granular material consisting of an AeroGel or NanoGel. This is represented in FIG. 1 by individual dots, which shall correspond to individual granules of a granular material.

Such a heat insulation 8 is prepared here as follows:

A prefabricated bellows is first lacquered according to a suitable technique, e.g., spraying, centrifugal coating and/or dipping with bonding agent 10 in the region to be coated after shaping, i.e., formation of the corrugated area with a sinusoidal shape of the corrugations. Then, before the lacquer is dry, free-flowing granular material is filled as an insulating material 11 into the bellows and distributed uniformly within bellows 2 by bellows 2 being rotated about its longitudinal axis and moved to and fro in the process, so that all regions coated with bonding agent 10 come into contact with the insulating material 11, and insulating material 11 now sticks to bonding agent 10. The granular material can be pressed onto the bonding agent 10 especially within bellows 2 by means of a pressing mandrel. Bonding agent 10 must dry thereafter, which is brought about by simply waiting for a certain period of time, blowing on with warm air, or by gently heating bellows 2. Excess granular material is removed in a further step, so that a layer of the insulating material 11 will remain. Bellows 2 is compressed at last. The lyre shape of the individual corrugations of the corrugated area 4 shown in FIG. 1 is obtained by compressing. In addition, an increased initial friction between the particles of the granular material is reduced by the compressing, as a result of which the mobility of an uncoated bellows 2 is achieved. Bellows 2 can then be processed further in the usual manner.

While specific embodiments of the invention have been shown and described in detail to illustrate the application of the principles of the invention, it will be understood that the invention may be embodied otherwise without departing from such principles.

The invention claimed is:

1. A process for manufacturing a heat-insulated uncoupling element, especially for exhaust gas lines of internal combustion engines, by applying a heat insulation, the process comprising the following steps:
    wetting a region to be coated in a corrugated area of a bellows body with a bonding agent;
    distributing heat-insulating granular material in the region to be coated on the bonding agent;
    drying the bonding agent; and
    removing excess granular material not bonded by the bonding agent to the bellows body.

2. A process in accordance with claim 1, wherein a lacquer is applied as the bonding agent.

3. A process in accordance with claim 1, wherein the bonding agent is applied along an entire length of a bellows area on a surface thereof.

4. A process in accordance with claim 1, wherein the bonding agent is applied to one or more of outer sides of inner rims of said bellows body, inner sides of outer rims of said bellows body and at least one surface of bellows flanks.

5. A process in accordance with claim 1, wherein the granular material is pressed against the still wet bonding agent for better bonding.

6. A process in accordance with claim 1, wherein application of the granular material to a wall of a bellows is carried out before a final shaping of the bellows to a lyre shape and the bellows is further compressed after removal of the excess granular material, so that corrugations of the bellows will assume the shape of a lyre in cross section.

7. An uncoupling element, especially for exhaust gas lines of internal combustion engines, the uncoupling element comprising:
    a bellows and a heat insulation thereof, the heat insulation being arranged along a corrugated area of the bellows and the heat insulation comprising a coating, which contains heat-insulting granular material.

8. An uncoupling element in accordance with claim 7, wherein the heat-insulating granular material is held on the bellows by a bonding agent.

9. An uncoupling element in accordance with claim 8, wherein the bonding agent is a lacquer.

10. An uncoupling element in accordance with claim 7, wherein said heat insulation is one of arranged within said bellows on bellows flanks thereof and outside said bellows on bellows flanks thereof.

11. An uncoupling element in accordance with claim 7, wherein the heat insulation is arranged on an inner side of said bellows on inner sides of outer rims.

12. An uncoupling element in accordance with claim 7, wherein said heat insulation is arranged on an outer side of said bellows on outer surfaces of inner rims of said corrugated area.

13. An uncoupling element in accordance with claim 7, wherein said coating, which contains said heat-insulting granular material, is in direct contact with said bellows.

14. A process in accordance with claim 1, wherein said bonding agent is applied directly to said bellows body, wherein said bonding agent directly engages said bellows body.

15. A process for manufacturing a heat-insulated uncoupling element, especially for exhaust gas lines of internal combustion engines, the process comprising:
    providing a bellows body, said bellows body comprising a corrugated area;
    applying a bonding agent directly to said bellows body, wherein said bonding agent is in direct contact with at least a portion of said corrugated area;
    providing heat-insulating granular material to said bonding agent after said bonding agent is directly applied to the surface of said bellows body;
    drying the bonding agent; and
    removing excess granular material not bonded by the bonding agent to the bellows body.

16. A process in accordance with claim 15, wherein said bonding agent is a lacquer, said bonding agent being dried after said heat-insulating granular material is applied to the bonding agent.

17. A process in accordance with claim 15, wherein the bonding agent is applied along an entire length of a bellows area on a surface thereof.

18. A process in accordance with claim 15, wherein the bonding agent is applied directly to one or more of outer sides of inner rims of said bellows body, inner sides of outer rims of said bellows body and at least one surface of bellows flanks of said bellows body.

19. A process in accordance with claim 15, wherein the granular material is pressed against the bonding agent prior to said bonding agent being dried such that the granular material is pressed against the bonding agent while said bonding agent is wet.

20. A process in accordance with claim 15, wherein application of the granular material to a wall of a bellows is carried out before a final shaping of the bellows to a lyre shape and the bellows is further compressed after removal of the excess granular material, so that corrugations of the bellows will assume the shape of a lyre in cross section.

* * * * *